United States Patent
Sapra et al.

(10) Patent No.: US 12,028,800 B2
(45) Date of Patent: Jul. 2, 2024

(54) METHODS, SYSTEMS, AND COMPUTER READABLE MEDIA FOR DETERMINING TIME RELATED PARAMETER VALUES FOR A COMMUNICATIONS NETWORK

(71) Applicant: Oracle International Corporation, Redwood Shores, CA (US)

(72) Inventors: Kawal Sapra, Bangalore (IN); Amarnath Jayaramachar, Bangalore (IN); Anup Shivarajapura, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 20 days.

(21) Appl. No.: 17/331,620

(22) Filed: May 26, 2021

(65) Prior Publication Data

US 2022/0386225 A1 Dec. 1, 2022

(51) Int. Cl.
*H04W 48/18* (2009.01)
*H04W 24/02* (2009.01)
*H04W 48/16* (2009.01)
*H04W 84/04* (2009.01)

(52) U.S. Cl.
CPC .......... *H04W 48/18* (2013.01); *H04W 24/02* (2013.01); *H04W 48/16* (2013.01); *H04W 84/042* (2013.01)

(58) Field of Classification Search
None
See application file for complete search history.

(56) References Cited

U.S. PATENT DOCUMENTS

| 9,432,150 B2 | 8/2016 | Jain et al. |
| 9,467,508 B2 | 10/2016 | Xu |
| 9,621,450 B2 | 4/2017 | Jeong et al. |
| 10,313,883 B2 | 6/2019 | Krishan |
| 10,448,449 B2 | 10/2019 | Aravamudhan et al. |

(Continued)

FOREIGN PATENT DOCUMENTS

| CN | 102883464 A | 1/2013 |
| CN | 103298110 A | 9/2013 |

(Continued)

OTHER PUBLICATIONS

Notice of Decision to Grant for European Patent Application No. 18755330.0 (dated Jul. 29, 2021).

(Continued)

*Primary Examiner* — Ajit Patel
*Assistant Examiner* — Angelie T Ngo
(74) *Attorney, Agent, or Firm* — Jenkins, Taylor & Hunt, P.A.

(57) ABSTRACT

One method for determining time related parameter values for a communications network occurs at network function (NF) repository function (NRF) including at least one processor. The method includes receiving, from a first NF, a service request message. The method further includes determining, using network information and/or NF information, a time related parameter value associated with the service request message. The method further includes generating and sending, to the first NF, a service response message indicating the time related parameter value.

16 Claims, 6 Drawing Sheets

(56) References Cited

U.S. PATENT DOCUMENTS

| | | |
|---|---|---|
| 10,511,998 B1 | 12/2019 | Vallur |
| 10,637,838 B1 | 4/2020 | Larios et al. |
| 10,652,850 B2 | 5/2020 | Landais et al. |
| 11,700,510 B2 | 7/2023 | Chaurasia et al. |
| 2013/0064158 A1 | 3/2013 | Sundell et al. |
| 2013/0080782 A1 | 3/2013 | Rajadurai et al. |
| 2014/0078968 A1 | 3/2014 | Korhonen et al. |
| 2014/0153391 A1 | 6/2014 | Ludwig et al. |
| 2015/0036591 A1 | 2/2015 | Cao et al. |
| 2015/0055459 A1 | 2/2015 | Wong et al. |
| 2015/0067328 A1 | 3/2015 | Yin |
| 2015/0119092 A1 | 4/2015 | Yi et al. |
| 2015/0256440 A1 | 9/2015 | Jeong et al. |
| 2015/0319172 A1 | 11/2015 | Zhang et al. |
| 2016/0007138 A1 | 1/2016 | Palanisamy et al. |
| 2016/0142860 A1 | 5/2016 | Kim et al. |
| 2016/0337841 A1 | 11/2016 | Won et al. |
| 2017/0142547 A1 | 5/2017 | Hou et al. |
| 2017/0366499 A1 | 12/2017 | De Boer et al. |
| 2018/0241615 A1 | 8/2018 | Livanos et al. |
| 2019/0021121 A1 | 1/2019 | Aravamudhan et al. |
| 2019/0141527 A1 | 5/2019 | Krishan |
| 2020/0344576 A1 | 10/2020 | Li et al. |
| 2021/0084582 A1* | 3/2021 | Li ................... H04W 24/02 |
| 2021/0234934 A1* | 7/2021 | Xia .................. H04L 67/61 |
| 2021/0250785 A1* | 8/2021 | Örtenblad .......... H04W 24/02 |
| 2021/0297935 A1* | 9/2021 | Belling ............. H04L 63/0281 |
| 2022/0015023 A1* | 1/2022 | De-Gregorio-Rodriguez ............. H04L 67/02 |
| 2022/0240084 A1 | 7/2022 | Speidel et al. |
| 2022/0264260 A1 | 8/2022 | Chaurasia et al. |
| 2023/0019000 A1* | 1/2023 | Li ................... H04W 48/18 |
| 2023/0188445 A1* | 6/2023 | Xin .................. H04W 24/02 709/224 |

FOREIGN PATENT DOCUMENTS

| | | |
|---|---|---|
| CN | 105306519 A | 2/2016 |
| CN | 106664516 A | 5/2017 |
| CN | 11295867 B | 7/2022 |
| CN | 110771252 B | 8/2023 |
| EP | 3 018 946 A1 | 5/2016 |
| IN | 518454 | 3/2024 |
| IN | 521506 | 3/2024 |
| JP | 2010-183542 A | 8/2010 |
| JP | 2015-073184 A | 4/2015 |
| JP | 2020/501192 | 10/2022 |
| JP | 7349984 B2 | 9/2023 |
| WO | WO-2010/021886 A1 | 2/2010 |
| WO | WO 2016/007494 A1 | 1/2016 |
| WO | WO 2016/156549 A1 | 10/2016 |
| WO | WO 2017/017879 A1 | 2/2017 |
| WO | WO 2019/014505 A1 | 1/2019 |
| WO | WO 2019/090270 A1 | 5/2019 |
| WO | WO 2020/221956 A1 | 11/2020 |
| WO | WO 2020/249242 A1 | 12/2020 |
| WO | WO 2021/047551 A1 | 3/2021 |

OTHER PUBLICATIONS

Communication under Rule 71(3) EPC Intent to Grant for European Patent Application Serial No. 18 755 330.0 (dated Mar. 16, 2021).

Commonly-Assigned, co-pending U.S. Appl. No. 17/175,260 for "Methods, Systems, and Computer Readable Media for Short Message Delivery Status Report Validation," (Unpublished, filed Feb. 12, 2021).

SMS Test Number: SMS Fake Delivery Receipts, Fake DLR—Tel!—SMS Test Platform and SMS services, Nov. 6, 2020, pp. 1-6, /https://telqtele.com/sms-fake-delivery-receipts-fake-dlr/.

Communication of European publication number and information on the application of Article 67(3) EPC for European Patent Application Serial No. 18815391.0 (dated Aug. 19, 2020).

Communication of European publication number and information on the application of Article 67(3) EPC for European Patent Application Serial No. 18755330.0 (dated Apr. 22, 2020).

Notice of Allowance and Fee(s) Due for U.S. Appl. No. 15/649,627 (dated May 30, 2019).

Notification of Transmittal of the International Search Report and the Written Opinion of the International Searching Authority, or the Declaration for International Application Serial No. PCT/US2018/059282 (dated Feb. 11, 2019).

Non-Final Office Action for U.S. Appl. No. 15/649,627 (dated Jan. 23, 2019).

Notice of Allowance and Fee(s) Due for U.S. Appl. No. 15/804,974 (dated Nov. 13, 2018).

Notification of Transmittal of the International Search Report and the Written Opinion of the International Searching Authority, or the Declaration for International Application Serial No. PCT/US2018/041911 (dated Oct. 12, 2018).

Non-Final Office Action for U.S. Appl. No. 15/804,974 (dated May 10, 2018).

Commonly-assigned, co-pending U.S. Appl. No. 15/804,974 for "Methods, Systems, and Computer Readable Media for using Authentication Validation Time Periods," (Unpublished, filed Nov. 6, 2017).

"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).

"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).

"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).

"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).

"LTE; General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).

"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).

"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).

"3rd Generation Partnership Project; Technical Specification Group Core Network and Terminals; Home Subscriber Server (HSS) diameter interfaces for interworking with packet data networks and applications (Release 14)," 3GPP TS 29.336 V.14.1.0, pp. 1-67 (May 2017).

"Universal Mobile Telecommunications System (UMTS); LTE; Home Subscriber Server (HSS) diameter interfaces for interworking with packet data networks and applications (3GPP TS 29.339 version 13.3.0 Release 13)," ETSI TS 129 336 V13.3.0, pp. 1-56 (Apr. 2016).

"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).

"Digital cellular telecommunications system (Phase 2+) (GSM); Universal Mobile Telecommunications System (UMTS); LTE; Architecture enhancements to facilitate communications with packet data (56) References Cited

OTHER PUBLICATIONS networks and applications (3GPP TS 23.682 V13.4.0 Release 13)," ETSI TS 123 682 V13.4.0, pp. 1-82 (Mar. 2016).

3GPP TS 29.338 version 11.0.0 Release 11, "Diameter based protocols for support of SMS capable MMEs.," Universal Mobile Telecommunications System (UMTS); LTE; Jan. 2013, pp. 1-42, France.

Croft, N., "On Forensics: A Silent SMS Attack," Information and Computer Security Architectures (ICSA) Research Group, Department of Computer Science, pp. 1-4, University of Pretoria, South Africa (2012).

"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).

Constantin, L., "Remote SMS attack can force mobile phones to send premium-rate text messages: Applications installed by operators on SIM cards can be exploited remotely for SMS fraud and DoS purposes," IDG News Service, Dec. 19, 2011, pp. 1-5, IDG Communications, Inc., United States.

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

"3rd Generation Partnership Project; Technical Specification Group Core Network and Terminals; 5G System; Network Data Analytics Services; Stage 3 (Release 17)," 3GPP TS 29.520, V17.2.0, pp. 1-99 (Mar. 2021).

"3rd Generation Partnership Project; Technical Specification Group Services and System Aspects; Security architecture and procedures for 5G system (Release 17)," 3GPP TS 33.501, V17.1.0, pp. 1-256 (Mar. 2021).

Office Action for Japanese Patent Application No. 2020-524589 (dated Mar. 7, 2023).

Notice of Allowance and Fee(s) Due for U.S. Appl. No. 17/175,260 (dated Feb. 27, 2023).

Office Action for CN Patent Application No. 201880040479.8 (dated Nov. 25, 2022).

Office Action for Japanese Patent Application No. 2020-524589 (dated Oct. 7, 2022).

Notification of Grant for Japanese Patent Application No. 2020-501192 (dated Sep. 13, 2022).

Non-Final Office Action for U.S. Appl. No. 17/175,260 (dated Aug. 29, 2022).

"3rd Generation Partnership Project; Technical Specification Group Core Network and Terminals; 5G System; Network Function Repository Services; Stage 3 (Release 16)", 3GPP TS 29.510 V16.3.0, pp. 1-172 (Mar. 2020).

Notification of Transmittal of the International Search Report and the Written Opinion of the International Searching Authority, or the Declaration for International Application Serial No. PCT/US2022/030887 (dated Sep. 9, 2022).

Notice of Decision to Grant for Japanese Patent Application No. 2018-01419 11 (dated Sep. 13, 2022).

Notice of Decision to Grant for Chinese Patent Application No. 201880070292.2 (dated Jun. 15, 2022).

Communication pursuant to Article 94(3) EPC for European Patent Application Serial No. 18 815 391.0 (dated Apr. 11, 2022).

Notification of Second Office Action for Chinese Patent Application No. 201880070292.2 (dated Apr. 2, 2022).

"3rd Generation Partnership Project; Technical Specification Group Services and System Aspects; Policy and charging control architecture (Release 14)." 3GPP TS 23.203 V14.40.0, pp. 128-131 (Jun. 2017).

Office Action for Japanese Patent Application Serial No. 2020-501192 (dated Mar. 8, 2022).

First Examination Report for Indian Patent Application Serial No. 201947045067 (dated Jan. 7, 2022).

First Examination Report for Indian Patent Application Serial No. 202047015197 (dated Nov. 5, 2021).

Notification of the First Office Action for Chinese Patent Application Serial No. 201880070292.2 (dated Oct. 30, 2021).

Notice of Grant for Japanese Patent Application Serial No. 2020524589 (dated Aug. 16, 2023).

Notification to Grant Patent Rights for Chinese Patent Application No. 201880040479.8 (dated May 26, 2023).

\* cited by examiner

| RULE ID | TIME VALUE DETERMINATION RULE |
|---|---|
| ID1 | NRF-NRF FORWARDING SCENARIO RULE |
| ID2 | GEO-REDUNDANT SCENARIO RULE |
| ID3 | NF CONGESTION SCENARIO RULE |
| ID4 | NRF CONGESTION SCENARIO RULE |

FIG. 4

| TIME RELATED PARAMETERS | EXAMPLE DEFAULT VALUES (E.G., PRIOR TO DYNAMIC CONFIGURATION) |
|---|---|
| NF HEARTBEAT INTERVAL | 30 SECONDS |
| NF SUBSCRIPTION VALIDITY TIME | 6 HOURS |
| NF DISCOVERY VALIDITY TIME | 1 HOUR |
| NF ACCESS TOKEN EXPIRY TIME | 1 HOUR |
| HTTP HEADER RETRY TIMER | 30 SECONDS |

METHODS, SYSTEMS, AND COMPUTER READABLE MEDIA FOR DETERMINING TIME RELATED PARAMETER VALUES FOR A COMMUNICATIONS NETWORK

TECHNICAL FIELD

The subject matter described herein relates to improving communications in fifth generation (5G) and subsequent generation communications networks. More particularly, the subject matter described herein relates to methods, systems, and computer readable media for determining time related parameter values for 5G and subsequent generation communications networks.

BACKGROUND

In fifth generation (5G) communications networks, a network node that provides service is referred to as a producer network function (NF). A network node that consumes services is referred to as a consumer NF. A network function can be both a producer NF and a consumer NF depending on whether it is consuming or providing service.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with an NF repository function (NRF). The NRF maintains service profiles of available NF instances identifying the services supported by each NF instance. Consumer NFs can subscribe to receive information about producer NF instances that have registered with the NRF. In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs various amounts of message filtering, policing, and topology hiding for application programming interface (API) messages.

In 5G and various other communications networks, timing issues can affect connectivity and usability. For example, if an access token or a subscription expires too soon, then an NF may not receive an expected or desired response. Hence, there exists a need for improving a communications network by reducing or mitigating timing issues.

SUMMARY

Methods, systems, and computer readable media for determining time related parameter values for a communications network are disclosed. One method for determining time related parameter values for a communications network occurs at a network function (NF) repository function (NRF) comprising at least one processor. The method comprises: receiving, from a first NF, a service request message; determining, using network information and/or NF information, a time related parameter value associated with the service request message; and generating and sending, to the first NF, a service response message indicating the time related parameter value.

One example system for determining time related parameter values for a communications network includes an NRF comprising at least one processor and a memory. The NRF is configured for: receiving, from a first NF, a service request message; determining, using network information and/or NF information, a time related parameter value associated with the service request message; and generating and sending, to the first NF, a service response message indicating the time related parameter value.

One example non-transitory computer readable medium comprising computer executable instructions embodied in the non-transitory computer readable medium that when executed by at least one processor of at least one computer cause the at least one computer to perform steps comprising: at an NRF comprising at least one processor: receiving, from a first NF, a service request message; determining, using network information and/or NF information, a time related parameter value associated with the service request message; and generating and sending, to the first NF, a service response message indicating the time related parameter value.

According to an aspect of the subject matter described herein, at least some network information or NF information (e.g., used in determining a time related parameter value) may be obtained periodically or aperiodically from one or more data sources.

According to an aspect of the subject matter described herein, one or more data sources may include a local data store, a remote data source, a network data analytics function (NWDAF), or an NF data provider.

According to an aspect of the subject matter described herein, at least some network information may be obtained using an Nnwdaf_EventsSubscription service or an Nnwdaf_AnalyticsInfo service.

According to an aspect of the subject matter described herein, determining a time related parameter value may include determining that an NRF, a first NF, or a network entity may be experiencing a congestion status change, a change in workload amount, or an operational status change; and, in response to the determination, adjusting the time related parameter value from a default value or a prior value.

According to an aspect of the subject matter described herein, a default value or a prior value (e.g., of a time related parameter) may be predetermined by a network operator or may be generated using a predetermined policy or rule.

According to an aspect of the subject matter described herein, determining a time related parameter value may include determining that a service request message or a related message requires NRF to NRF forwarding; and, in response to the determination, increasing the time related parameter value from an initial or default value.

According to an aspect of the subject matter described herein, determining a time related parameter value may include determining that a service request message or a related message may be an inter public land mobile network (PLMN) message; and, in response to the determination, increasing the time related parameter value from an initial or default value.

According to an aspect of the subject matter described herein, a service request message may include an NF registration request message, an NF update request message, an NF status subscription request message, an NF discovery request message, or an NF access token request message.

According to an aspect of the subject matter described herein, a time related parameter value may indicate an NF heartbeat interval, an NF subscription validity time, an NF discovery validity time, an NF access token expiry time, or a hypertext transfer protocol (HTTP) header retry timer.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for determining time related parameter values in a communications network. In a Third Generation Partnership Project (3GPP) defined 5G communications network, an network function (NF) repository function (NRF) can make decisions on various time related parameter values (e.g., timer values and validity time values) for various service operations. However, current NRF implementations use statically configured or unanimously agreed-upon values for various time related parameters, e.g., an NF heartbeat interval (e.g., a 3GPP heart-beat timer), an NF subscription validity time, an NF discovery validity time, an NF access token expiry time, or an HTTP header retry timer (e.g., a value in a "Retry-After" HTTP header parameter field). Moreover, there is no mechanism in 3GPP Technical Specification (TS) 29.510 defining NRF functionality for determining time related parameters values by considering dynamic network and/or deployment conditions. Various issues, such as connectivity problems and/or timing issues, can arise when time related parameter values are not appropriate for relevant use-cases or scenarios (e.g., current network conditions or other factors affecting one or more NFs). For example, statically configured time related parameter values may not allow effective communications between NFs or other network elements, e.g., since some network use-cases or scenarios (e.g., communications that traverse different localities and PLMNs) can cause various delays.

In accordance with some aspects of the subject matter described herein, methods, systems, mechanisms, and/or techniques are disclosed for determining time related parameter values for communications networks using obtained network information and/or NF information. For example, an NRF in accordance with various aspects described herein may be configured for receiving, from a first NF, a service request message; determining, using network information and/or NF information, a time related parameter value associated with the service request message; and generating and sending, to the first NF, a service response message indicating the time related parameter value. In this example, the network information and/or NF information used in the determination may be periodically or aperiodically obtained from various data sources, such as a network data analytics function (NWDAF) or another NF data provider (e.g., an NF metrics server).

Advantageously, by utilizing one or more techniques, systems, and/or methods described herein, a NRF or other entity may determine time related parameter values based on various information, e.g., dynamic network conditions and/or NF health or performance metrics. Further, since some time related parameters values (e.g., an NF heartbeat interval value and/or an HTTP header retry timer value) can directly affect the amount and/or frequency of some traffic sent by NFs, dynamic determination of time related parameter values can reduce traffic processing load at NFs and NRF or improve resource utilization. For example, by increasing the allowed time between consecutive heartbeat message when network congestion is detected, an NF can spend less time sending such messages and an NRF can spend less time processing such message. In this example, the reduction in heartbeat message may also help to reduce the congestion in the network. Similar effects may also be seen by increasing some other time related parameter values, e.g., an NF subscription validity time, an NF discovery validity time, an NF access token expiry time. Furthermore, by utilizing one or more aspects described herein, an example NRF may increase overall core network performance by determining time related parameter values (e.g., optimized and/or use case based timer values) using current or recent network information and/or NF information. Moreover, an example NRF in accordance with various aspects described herein may be fully backward compatible, may not impact NFs from various vendors, and may not require changes to existing 3GPP defined 5GC call flows.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
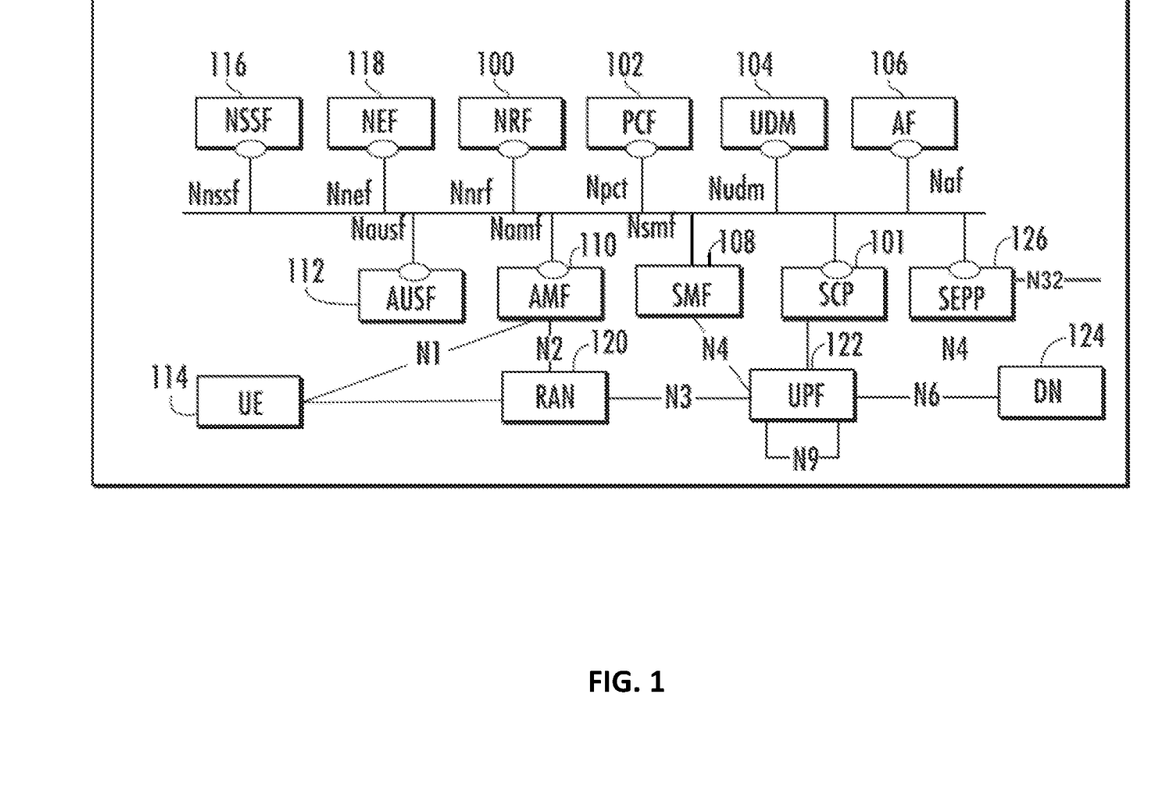
FIG. 1 is a network diagram illustrating an example fifth generation (5G) network architecture.

FIG. 1 is a block diagram illustrating an example 5G system network architecture, e.g., a home 5G core (5GC) network. The architecture in FIG. 1 includes an NRF 100 and an SCP 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile may a JavaScript object notation (JSON) data structure defined in 3GPP TS 29.510. The NF or service profile definition includes at least one of a fully qualified domain name (FQDN), an Internet protocol (IP) version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. RAN 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs usable for forwarding various communications (e.g., 5GC request messages) between a consumer NF and a producer NF after applying application level security protection.

One issue with the existing 5G architecture is that current NRF implementations use statically configured or unanimously agreed-upon values for various time related parameters. However, connectivity issues and/or timing issues can arise when time related parameter values are not appropriate for relevant use-cases or scenarios (e.g., current network conditions or other factors affecting one or more NFs)

It will be appreciated that FIG. 1 is for illustrative purposes and that various nodes and/or modules, locations, and/or functionality described above in relation to FIG. 1 may be changed, altered, added, or removed.

Figure 2:
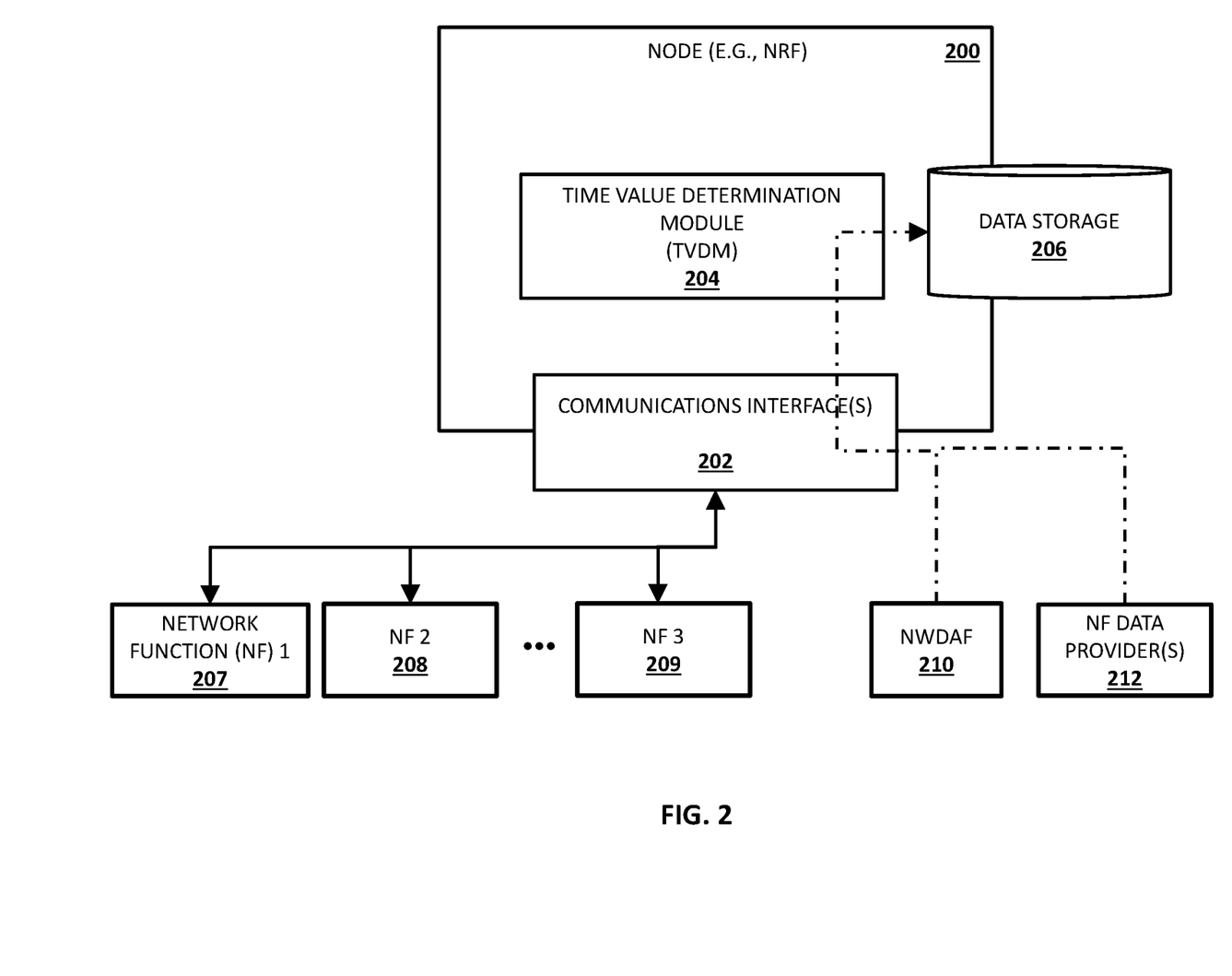
FIG. 2 is a diagram illustrating an example network node for determining time related parameter values for a communications network.

FIG. 2 is a diagram illustrating an example network node 200 for determining time related parameter values for a communications network (e.g., a 5G communications network). Node 200 may represent any suitable entity or entities for performing various aspects of authorization, registration, and/or configuration functions, e.g., determining appropriate time related parameter values using relevant network information and/or NF information. In some embodiments, node 200 may represent or include one or more 5GC NFs, e.g., NRF 100. In some embodiments, node 200 may represent or include a consumer NF or a producer NF. In some embodiments, node 200 may represent or include an authorization server, a data repository, a network gateway, a network proxy, an edge security device, or other functionality.

In some embodiments, node 200 or a related module (e.g., a parameter configuration module) may be configured (e.g., via programming logic) for determining time related parameter values (e.g., 3GPP network parameters values) using network information and/or NF information (e.g., obtained periodically or aperiodically from NWDAF 210 and/or NF data provider(s) 212. For example, node 200 or a related module may communicate with a NWDAF 210 and/or an NF data provider(s) 212 to periodically or periodically obtain current network information or NF information. In this example, node 200 or a related module may use this obtained information to determine one or more time related parameter values for various NF instances, NF1 207, NF2 208, or NF3 209. Example time related parameter values may include values indicating an NF heartbeat interval (e.g., a 3GPP heart-beat timer), an NF subscription validity time, an NF discovery validity time, an NF access token expiry time, or an HTTP header retry timer (e.g., a value in a "Retry-After" HTTP header parameter field).

NWDAF 210 may represent a network node or device configured for performing various network analytics functions. For example, NWDAF 210 may include at least some NWDAF functionality defined in 3GPP TS 29.520. In some embodiments, NWDAF 210 may provide an Nnwdaf_EventsSubscription service for enabling NF service consumers to subscribe to/unsubscribe from notifications for different analytics information. Example notification events may include slice load level information, network slice instance load level information, service experience, NF load, network performance, abnormal behavior, UE mobility, UE communication, user data congestion, or quality of service (QoS) sustainability. In some embodiments, NWDAF 210 may provide an Nnwdaf_AnalyticsInfo service for enabling NF service consumers to request and get specific analytics information from NWDAF 210. Example analytics information available from NWDAF 210 may include slice load level information, network slice instance load level information, service experience, NF load, network performance, abnormal behavior, UE mobility, UE communication, user data congestion, or quality of service (QoS) sustainability.

NF data provider(s) 212 may represent one or more network nodes or devices configured for generating and/or providing NF metrics or other related NF information. For example, NF data provider(s) 212 may provide various types of metrics and/or data usable for determining appropriate time related parameter values to node 200, a module for determining time related parameter values, and/or a data store accessible to node 200 or module(s) for determining time related parameter values. Example NF metrics or related information may include a congestion or overload status, message queue information, connectivity issue information, or various performance metrics, such as an nf-name_message_processing_time for indicating the time taken (in milliseconds) by an NF's specific microservice to process a service operation.

In some embodiments, NF data provider(s) 212 may include an NF or related node providing performance metrics, state information, or other relevant data about itself to one or more entities, e.g., node 200 (e.g., NRF 100) or a data store. In some embodiments, NF data provider(s) 212 may include a network management system, a network tap, or a data aggregator that receives, intercepts, or derives various NF information and uses that information to generate and/or provide NF metrics and/or other data to one or more entities.

Referring to FIG. 2, node 200 may include one or more communications interface(s) 202 for communicating messages via a communications environment, e.g., a home 5GC network. For example, communications interface(s) 202 may include a first communication interface for communicating with a first set of SEPPs 126 in a home network, a second communications interface for communicating with a second set of SEPPs 126 in a home network, and a third communications interface for communicating with other entities in a home network.

Node 200 may include a time value determination module (TVDM) 204. TVDM 204 may be any suitable entity (e.g., software executing on at least one processor) for performing one or more aspects associated with parameter configuration, e.g., determining time related parameter values. In some embodiments, TVDM 204 may be configured for communicating with NWDAF 210 and/or NF data provider(s) 212 to periodically or periodically obtain relevant (e.g., current or recent) network information or NF information for determining appropriate time related parameter values for various scenarios and/or service operations. For example, TVDM 204 may subscribe to various events and may receive notifications of such events from NWDAF 210 and/or NF data provider(s) 212. In this example, such event notifications and/or data therein may be used by TVDM 204 when determining appropriate time related parameter values.

In some embodiments, TVDM 204 may be configured for using obtained network information and/or NF information when determining one or more time related parameter values. For example, TVDM 204 may be configured for receiving, from NF3 209, a service request message (e.g., an NFUpdate message); determining, using network information and/or NF information, a time related parameter value associated with the service request message; and generating and sending, to NF3 209, a service response message (e.g., an "200 OK" response message) indicating the time related parameter value. In this example, using network information and/or NF information (e.g., stored in data storage 206) obtained via NWDAF 210 and/or NF data provider(s) 212, NRF 100 may determine that NRF 100 and/or another NF (or a related transmission path) is experiencing congestion or operational issues, and, to alleviate congestion and/or mitigate one or more negative affects associated with the detected issue(s), NRF 100 may determine to temporarily increase (e.g., relative to a prior used value) an NF heartbeat interval (e.g., a 3GPP heart-beat timer) associated with NF3 209, thereby reducing the number and frequency of heartbeat messages need to be sent by NF3 209 to be deemed operational (or "alive"), e.g., by NRF 100. Continuing with this example, after detected issues are resolved or are no longer relevant (e.g., as determined by NRF 100 using more recent network information and/or NF information, NRF 100 may determine to decrease the NF heartbeat interval associated with NF3 209 (e.g., back to a default or pre-issue value) when NF3 209 sends another service request message (e.g., an NFUpdate message).

In some embodiments, TVDM 204 may be configured for accessing or utilizing one or more data stores (e.g., in data storage 206) containing rules for determining time related parameters based on various scenarios (e.g., use-cases, network conditions, NRF and/or NF congestion, communications path related delays like inter-PLMN communications and/or geo-redundant sites, etc.) and/or default values for various time related parameters. For example, TVDM 204 may identify and/or use relevant rules based on various information including, for example, network information and/or NF information obtained from or via one or more data sources, e.g., NWDAF 210 and/or NF data provider(s) 212. In this example, a relevant rule may indicate an acceptable value, an acceptable range of values or may provide a formula, an algorithm, or other way for determining one or more acceptable time parameter values.

In some embodiments, TVDM 204 may be configured for accessing or utilizing one or more data stores (e.g., in data storage 206) containing time value information, e.g., default, historical, and/or acceptable values (or ranges of values) for various time related parameters. In such embodiments, TVDM 204 may use stored time value information along with relevant rules to determine appropriate time related parameter values. For example, TVDM 204 may determine, using recently obtained network information and/or NF information, that a network element or NF is experiencing congestion, and may select a relevant rule for this scenario. In this example, the relevant rule may indicate that a default value or a prior used value associated with a particular time related parameter value (e.g., located in a time value information data store) is to be increased by 100%, e.g., an HTTP header retry timer is increased to 60 seconds from 30 seconds.

Node 200 and/or TVDM 204 may access (e.g., read from and/or write information to) data storage 206. Data storage 206 may be any suitable entity (e.g., a computer readable medium or memory) for storing various data. In some embodiments, data storage 206 may include network information, NF metrics, time value determination rules, default values, and/or related information used in dynamically determining or deriving time related parameter values. In some embodiments, data storage 206 may include logic for obtaining or requesting relevant network information and/or NF information (e.g., NF performance metrics) from one or more data sources. In some embodiments, data storage 206 may include logic or rules for detecting or determining one or more scenarios (e.g., network use cases) for adjusting a time related parameter value. In some embodiments, data storage 206 may include logic or rules for determining a time related parameter value based on detected or determined scenarios.

It will be appreciated that FIG. 2 and its related description are for illustrative purposes and that node 200 may include additional and/or different modules, components, or functionality.

Figure 3:
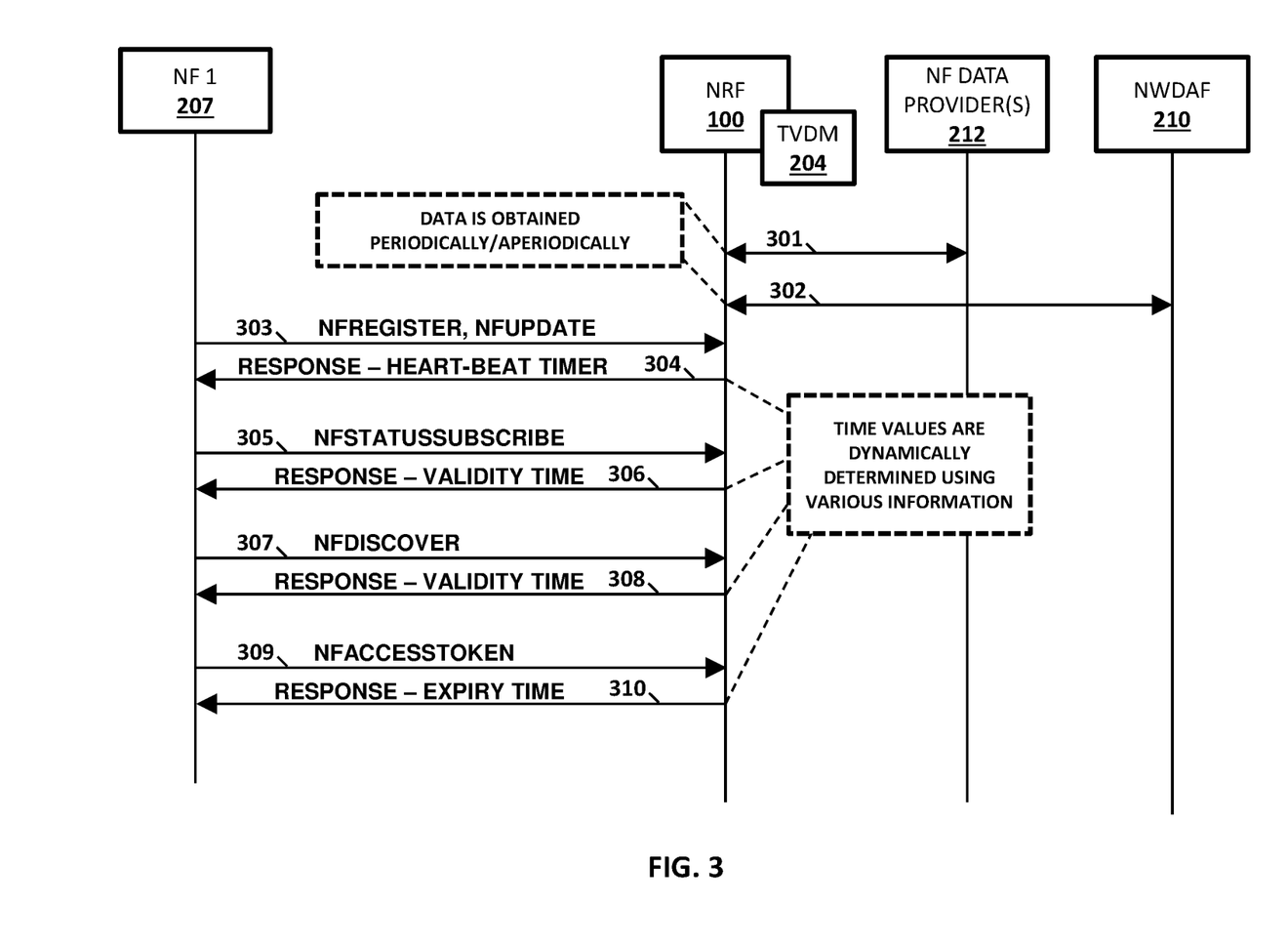
FIG. 3 is a message flow diagram illustrating an example NRF dynamically determining time related parameter values using network information and/or NF information.

FIG. 3 is a message flow diagram illustrating an example NRF 100 comprising functionality (e.g., TVDM 204) for dynamically determining time related parameter values using network information and/or NF information. In some embodiments, NRF 100 or TVDM 204 therein may utilize recent or current network information (e.g., analytics information from NWDAF 210) and/or NF information (e.g., NF related metrics from NF data provider(s) 212) to determine appropriate time related parameter values, e.g., by adjusting a default or prior value. For example, NRF 100 or TVDM 204 therein can dynamically determine time related parameter values (e.g., an NF heartbeat interval value) depending on a routing scenario associated with a requesting entity or current network conditions learned from data obtained from one or more data sources.

Referring to FIG. 3, in step 301, NF metrics or other NF related information may be sent from NF data provider(s) 212 to NRF 100 or a related entity (e.g., data storage 206). For example, NF data provider(s) 212 may provide message processing time metrics associated with multiple NFs, e.g., NF1 207, NF2 208 and NF3 209.

In step 302, network information (e.g., analytics information) may be sent from NWDAF 210 to NRF 100 or a related entity (e.g., data storage 206). In some examples, NRF 100 or TVDM 204 may subscribe to various events via an Nnwdaf_EventsSubscription service provided by NWDAF 210 and may receive notifications (along with network information) when subscribed events occur. In some examples, NRF 100 or TVDM 204 may request analytics information at periodic or aperiodic intervals using an Nnwdaf_AnalyticsInfo service provided by NWDAF 210

In step 303, an NF registration related request message (e.g., an NFRegister or NFUpdate message) may be sent to NRF 100 from NF1 207. For example, assuming NF1 207 is an visitor PLMN (different from NRF 100), an NFRegister message may originate from NF1 207 and may traverse SEPPs 126 before reaching NRF 100. In this example, NRF 100 or TVDM 204 may analyze characteristics of the NFRegister message (e.g., its originating PLMN) along with learned network information and/or NF information to dynamically determine one or more time related parameters, such as an NF heartbeat interval (e.g., a 3GPP heart-beat timer value), associated with the NF registration related request message.

In some embodiments, an NF heartbeat interval may represent a parameter or setting indicating an amount of time (e.g., in seconds) expected between two consecutive heart-beat messages, e.g., from an NF instance (e.g., NF1 207) to NRF 100. In some embodiments, an NF heartbeat interval may be determined and provided during an NF registration or an NF update procedure using a "heart-beat timer" parameter. For example, a proposed value for an NF heart-beat timer parameter may be provided in an NFRegister request message by NF1 207 to NRF 100. In this example, if the proposed heart-beat timer value is acceptable (e.g., as determined by NRF 100 and/or TVDM 204 therein), NRF 100 may confirm the value in an NFRegister response message. If the proposed heart-beat timer value is unacceptable (e.g., as determined by NRF 100 and/or TVDM 204 therein), NRF 100 and/or TVDM 204 therein may determine a different time related parameter value (e.g., by adjusting a default value in response to network and/or NF conditions) and provide the different time related parameter value in an NFRegister response message to NF1 207.

In step 304, an NF registration related response message indicating one or more time related parameters may be sent from NRF 100 to NF1 207. For example, a response to an NFRegister message associated with NF1 207 may indicate a 3GPP heart-beat timer value that is based on learned information or factors associated with NF1 207. In this example, the 3GPP heart-beat timer value associated with NF1 207 may be different from a 3GPP heart-beat timer value associated with a different NF (e.g., NF2 208) or a standard or default value. In step 305, an NF subscription request message (e.g., an NFStatusSubscribe message) may be sent to NRF 100 from NF1 207. For example, NRF 100 or TVDM 204 may analyze characteristics of a received NFStatusSubscribe message along with learned network information and/or NF information and determine that the NF being subscribed to is overloaded or congested and may dynamically determine one or more time related parameters, such as an NF subscription validity time value, associated with the NF subscription request message.

In some embodiments, an NF subscription validity time may represent a parameter or setting indicating an amount of time (e.g., in hours) that a related subscription is active, e.g., after which the subscription may be deemed inactive and/or deleted at NRF 100. In some embodiments, an NF subscription validity time may be determined and provided during an NF subscription procedure using a "validity time" parameter. For example, a proposed value for a subscription validity time parameter may be provided in an NFStatusSubscribe request (e.g., subscription creation request) message by NF1 207 to NRF 100. In this example, if the proposed subscription validity value is acceptable (e.g., as determined by NRF 100 and/or TVDM 204 therein), NRF 100 may confirm the value in an NFStatusSubscribe response message. If the proposed subscription validity value is unacceptable (e.g., as determined by NRF 100 and/or TVDM 204 therein), NRF 100 and/or TVDM 204 therein may determine a different time related parameter value (e.g., by adjusting a default value in response to network and/or NF conditions) and provide the different time related parameter value in an NFStatusSubscribe response message to NF1 207.

In step 306, an NF subscription response message indicating one or more time related parameters may be sent from NRF 100 to NF1 207. For example, a response to an NFStatusSubscribe message associated with NF1 207 may indicate an NF subscription validity time value that is based on learned information or factors associated with NF1 207. In this example, the NF subscription validity time value associated with NF1 207 may be different from an NF subscription validity time value associated with a different NF (e.g., NF2 208) or a standard or default value.

In step 307, an NF discovery request message (e.g., an NFDiscover message) may be sent to NRF 100 from NF1 207. For example, NRF 100 or TVDM 204 may analyze characteristics of a received NFDiscover message along with learned network information and/or NF information and determine that the NF being discovered is overloaded or congested and may dynamically determine one or more time related parameters, such as an NF discover validity time value, associated with the NF discovery request message.

In some embodiments, an NF discovery validity time may represent a parameter or setting indicating an amount of time (e.g., in hours) that search results from a discovery or search is valid, e.g., after which the search results may be deemed invalid and/or deleted from a cache at an NF service consumer, e.g., NF1 207. In some embodiments, an NF discovery validity time may be determined and provided during an NF discovery procedure using a "validity time" parameter. For example, a proposed value for a discovery validity time parameter may be provided in an NFDiscover request message by NF1 207 to NRF 100. In this example, if the proposed discovery validity value is acceptable (e.g., as determined by NRF 100 and/or TVDM 204 therein), NRF 100 may confirm the value in an NFDiscover response message. If the proposed discovery validity value is unacceptable (e.g., as determined by NRF 100 and/or TVDM 204 therein), NRF 100 and/or TVDM 204 therein may determine a different time related parameter value (e.g., by adjusting a default value in response to network and/or NF conditions) and provide the different time related parameter value in an NFDiscover response message to NF1 207.

In step 308, an NF discovery response message indicating one or more time related parameters may be sent from NRF 100 to NF1 207. For example, a response to an NFDiscover message associated with NF1 207 may indicate an NF discovery validity time value that is based on learned information or factors associated with NF1 207. In this example, the NF discovery validity time value associated with NF1 207 may be different from an NF discovery validity time value associated with a different NF (e.g., NF2 208) or a standard or default value.

In step 309, an NF access token request message (e.g., an NFAccessToken request message) may be sent to NRF 100 from NF1 207. For example, NRF 100 or TVDM 204 may analyze characteristics of a received NFAccessToken request message along with learned network information and/or NF information and determine that the NF associated with the access token request is overloaded or congested and may dynamically determine one or more time related parameters, such as an NF access token expiry time value, associated with the NF access token request message.

In some embodiments, an NF access token expiry time may represent a parameter or setting indicating an amount of time (e.g., in hours) that an NF access token is valid, e.g., after which the access token may be deemed invalid. In some embodiments, an NF access token expiry time may be determined and provided during an NF access token request procedure using a "expiration time" parameter. For example, an NFAccessToken request message may be sent from NF1 207 to NRF 100. In this example, NRF 100 and/or TVDM 204 therein may determine an expiration time related parameter value (e.g., by adjusting a default value in response to network and/or NF conditions) and provide the time related parameter value in an NFAccessToken response message to NF1 207.

In step 310, an NF subscription response message indicating one or more time related parameters may be sent from NRF 100 to NF1 207. For example, a response to an NFAccessToken request message associated with NF1 207 may indicate an NF access token expiry time value that is based on learned information or factors associated with NF1 207. In this example, the access token expiry time value associated with NF1 207 may be different from an access token expiry time value associated with a different NF (e.g., NF2 208) or a standard or default value.

It will be appreciated that FIG. 3 is for illustrative purposes and that different and/or additional messages and/or actions may be used. It will also be appreciated that various messages and/or actions described herein may occur in a different order or sequence.

Figure 4:
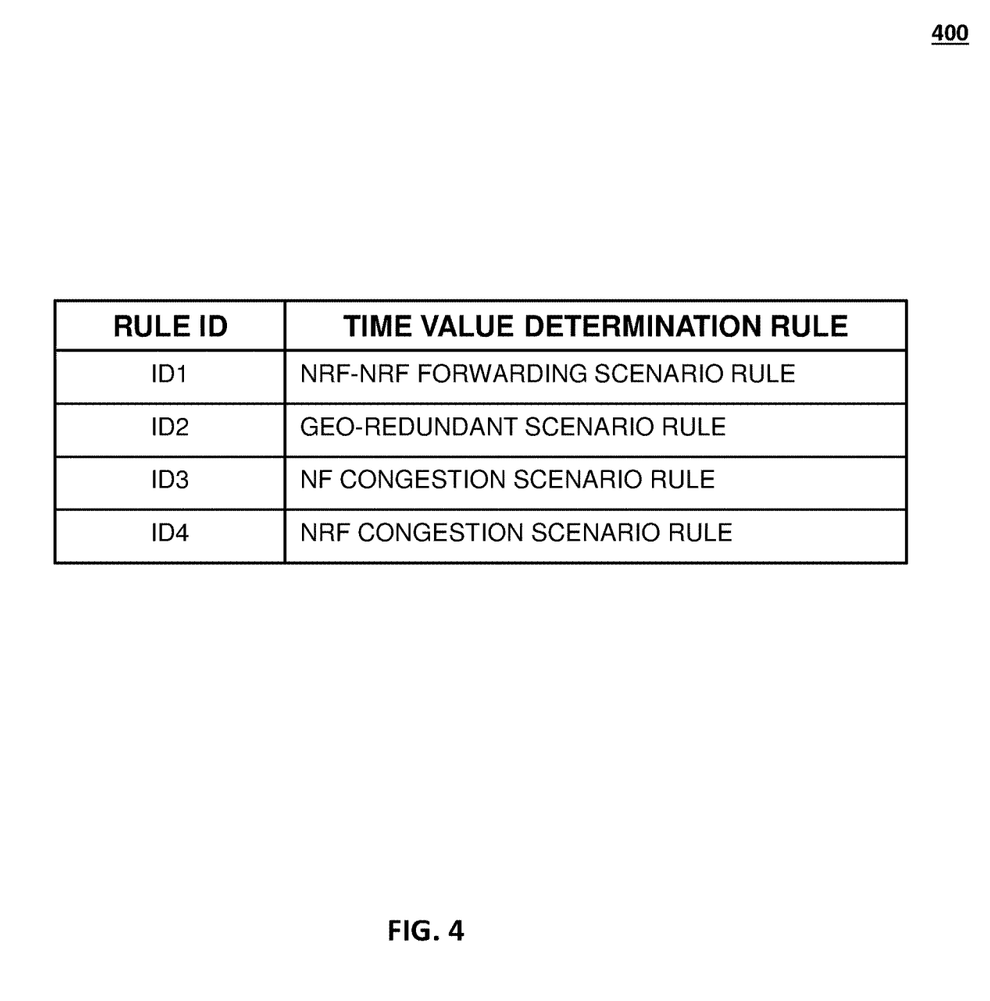
FIG. 4 is a diagram illustrating example rule data indicating rule IDs and related time related parameter value determination rules.

FIG. 4 is a diagram illustrating example rule data 400 indicating rule IDs and related time related parameter value determination rules for determining time related parameter values for one or more time related parameters (e.g., based on network conditions, NF performance metrics, and/or other factors). For example, rule data 400 may indicate mappings (e.g., associations) between a rule ID and a related time related parameter value determination rule. In some embodiments, a rule mapping or association may be statically configured by an operator or may be dynamically generated by NRF 100, e.g., using historical data and user-provided preferences. For example, NRF 100 may receive a set of rules for different scenarios from a network operator and expected performance information for NRF 100. In this example, if a rule for a given scenario is not having an expected result (e.g., NRF is still experiencing congestion), NRF 100 may dynamically adjust the rule (e.g., increase time related parameter value by 15%) in an attempt to achieve the expected result.

In some embodiments, node 200, NRF 100, or TVDM 204 may be configured for selecting time related parameter value determination rules and/or logic based on characteristics or scenarios associated with a received message or a related entity, e.g., an NF service consumer or an NF service producer. For example, NRF 100 may analyze a received message to determine whether the message has originated or been forwarded from a different PLMN (e.g., by a visitor NRF 100 or NF1 207). In addition to or in lieu of where a received messages originates, NRF 100 may determine using various data (e.g., periodically fetched network information and/or NF information) whether itself or another network entity (e.g., the requesting entity) is experience a congestion event or other issue that may effect processing or communications. In this example, using various information available to NRF 100, NRF 100 may select a relevant time related parameter value determination rule, wherein the time related parameter value determination rule may indicate a formula or logic for determining an appropriate value for a particular time related parameter. For example, if node 200, NRF 100, or TVDM 204 determines that NRF 100 is experiencing congestion, a time related parameter value determination rule 'ID4' may be selected that double or triples a predetermined default value for a particular short term parameter (e.g., NF heartbeat interval or HTTP header retry timer). In another example, if node 200, NRF 100, or TVDM 204 determines that a requesting entity is located in a different network, a time related parameter value determination rule 'ID1' may be selected that increasing a predetermined or proposed default value by 25% or increasing a predetermined default value such that the new time related parameter value is greater than a derived or estimated one-way delay or other metric.

Referring to FIG. 4, a table representing rule data 400 comprises columns and/or fields for rule IDs and corresponding time related parameter value determination rules. A rule ID field may store information for representing an identifier that identifies a time related parameter value determination rules. In some embodiments, each rule ID may be globally unique inside a PLMN, e.g., a unique number or alphanumeric value. In some embodiments, rule IDs may be hierarchical or provide insights into related rules. In some embodiments, rule IDs may be non-hierarchical or opaque regarding insights into related rules.

A time related parameter value determination rule field may represent one or more rules or logic for determining a time related parameter value for one or more time related parameters. In some embodiments, a rule may be based on a network or NF scenario and/or discernible characteristics associated with a received message, a requesting entity, or a related service. Example scenario-based rules may include one or more time related parameter value determination rules for an NRF to NRF forwarding scenario, a geo-redundant scenario, an NF congestion rule, and an NRF congestion scenario.

In some embodiments, node 200, NRF 100, or TVDM 204 may be configured for determining that a received message or related entity is associated with an NRF to NRF forwarding scenario and, using one or more related rules, may adjust one or more time related parameters according to various information, e.g., obtained via NWDAF 210 and/or NF data provider(s) 212. For example, node 200, NRF 100, or TVDM 204 may determine that a received message is associated with an NRF to NRF forwarding scenario when NRF 100 lacks information for a relevant producer NF associated with a received message and, as such, may involve various messages traversing PLMN boundaries and localities. In this example, after detecting an NRF to NRF forwarding scenario, node 200, NRF 100, or TVDM 204 may determine an appropriate value for one or more time related parameters (e.g., an NF subscription validity time, an NF discovery validity time, or an NF access token expiry time), e.g., for reducing traffic crossing PLMN boundaries and different localities and/or for allowing additional time for expected or possible packet delays.

In some embodiments, node 200, NRF 100, or TVDM 204 may be configured for determining that a received message or related entity is associated with a geo-redundant scenario and, using one or more related rules, may adjust one or more time related parameters according to various information, e.g., obtained via NWDAF 210 and/or NF data provider(s) 212. For example, node 200, NRF 100, or TVDM 204 may determine that a received message is associated with a geo-redundant scenario when the received message or a related message traverses one or more geo-redundant sites and, as such, may involve various messages being handled from NFs of a mate or peer NRF 100. In this example, after detecting a geo-redundant scenario, node 200, NRF 100, or TVDM 204 may determine an appropriate value for one or more time related parameters (e.g., an NF heartbeat interval, an NF subscription validity time, an NF discovery validity time, or an NF access token expiry time), e.g., for reducing traffic crossing geo-redundant sites and/or for allowing additional time for expected or possible packet delays.

In some embodiments, node 200, NRF 100, or TVDM 204 may be configured for determining that NRF 100 is experiencing an operational issue (e.g., overloaded, handling peak traffic, under maintenance, etc.) based on obtained network information and/or NF information and, using one or more related rules, may adjust one or more time related parameters according to such issue. For example, node 200, NRF 100, or TVDM 204 may determine that an NRF 100 is experiencing congestion or is under maintenance based on various information (e.g., via a subscribed event notification from NWDAF 210). In this example, after detecting that NRF 100 is congested or under maintenance, node 200, NRF 100, or TVDM 204 may determine an appropriate value for one or more time related parameters (e.g., an NF heartbeat interval, an HTTP header retry timer, an NF subscription validity time, an NF discovery validity time, or an NF access token expiry time), e.g., for reducing traffic handled by NRF 100 and/or for allowing additional time for expected or probable packet delays.

In some embodiments, node 200, NRF 100, or TVDM 204 may be configured for determining that an NF (e.g., a requested or appropriate producer NF for handling a particular service request) is experiencing an operational issue (e.g., overloaded, handling peak traffic, under maintenance, etc.) based on obtained network information and/or NF information and, using one or more related rules, may adjust one or more time related parameters according to such issue. For example, node 200, NRF 100, or TVDM 204 may determine that a producer NF is experiencing congestion or is under maintenance based on various information (e.g., an nf-name_message_processing_time metric or related data from NF data provider(s) 212). In this example, after detecting that the producer NF is congested or under maintenance, node 200, NRF 100, or TVDM 204 may determine an appropriate value for one or more time related parameters (e.g., an NF heartbeat interval, an HTTP header retry timer, an NF subscription validity time, an NF discovery validity time, or an NF access token expiry time), e.g., for reducing less important traffic and/or for allowing additional time for expected or possible packet delays. In some embodiments, by increasing values associated with time related parameters (e.g., an NF heartbeat interval), an overloaded NF may reduce its heartbeat related traffic towards NRF 100 and instead use its resources for processing requests during overload conditions.

In some embodiments, node 200, NRF 100, or TVDM 204 may use one or more determined time related parameter values for subsequent requests or operations. For example, after an NRF 100 is determined to be congested, an NF heartbeat interval (e.g., a heart-beat timer value) used by NFs may be increased from 30 seconds to 90 seconds and the NFs can be informed of the new value in response to subsequent 3GPP operations, e.g., NF registrations and NF updates. In this example, after an NRF 100 is determined to be no longer be congested, the NF heartbeat interval used by NFs may be decreased back to 30 seconds and the NFs may be informed of the new value in response to subsequent 3GPP operations.

It will also be appreciated that rule data 400 is for illustrative purposes and that different and/or additional data than the data depicted in FIG. 4 may be usable for determining time related parameter values. For example, rule data 400 may include various scenarios not depicted, including combination scenarios, such as NRF and NF congestion. In this example, rule data 400 may include priority values for indicating which rule(s) are to be selected or used. In another example, rule data 400 may include one or more rules for different time related parameters for the same scenario. Further, rule data 400 may be stored (e.g., in data storage 206 using various data structures and/or computer readable media.

Figure 5:
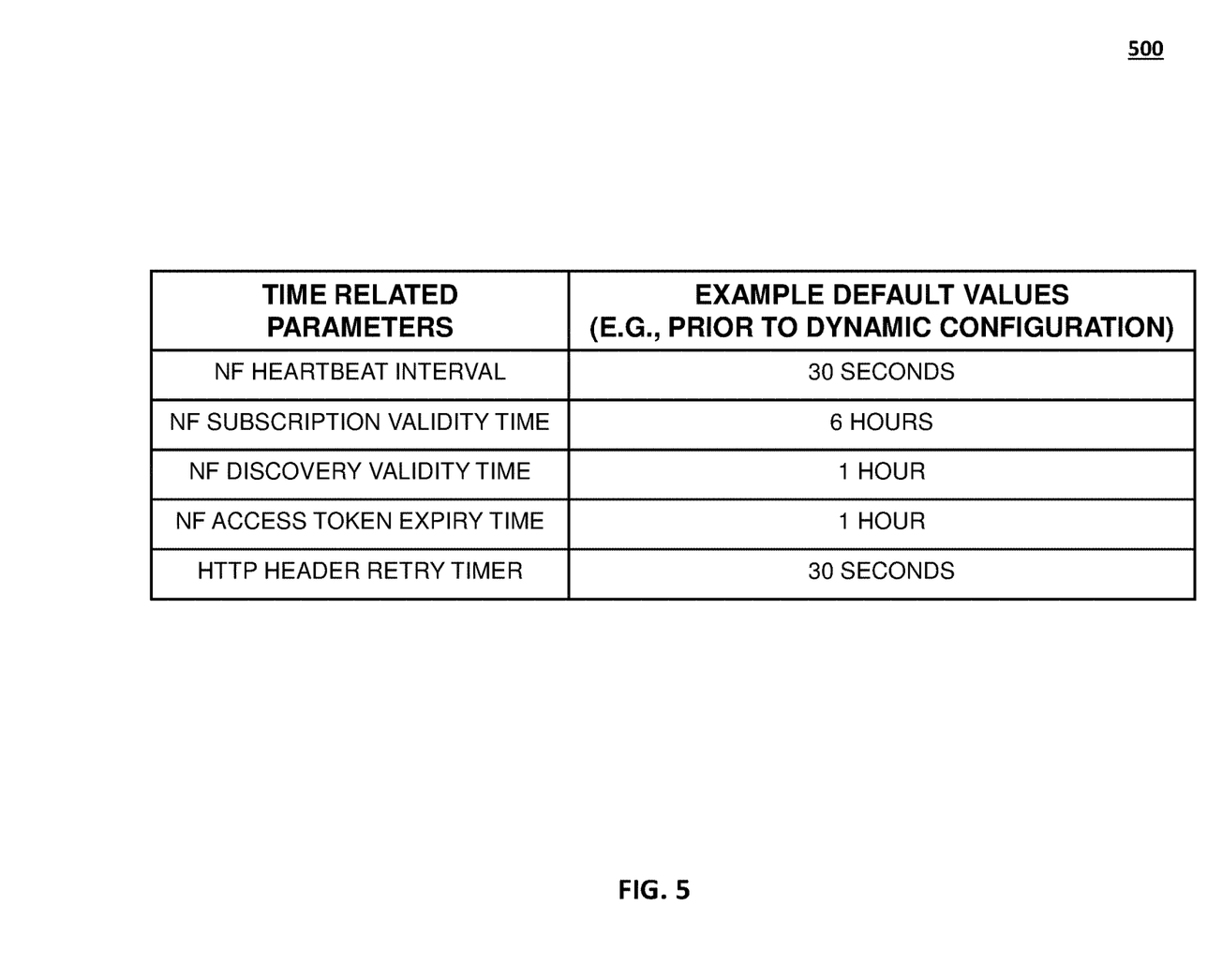
FIG. 5 is a diagram illustrating example default value information for various time related parameters.

FIG. 5 is a diagram illustrating example default value information 500 for various time related parameters in a communications network. For example, default value information 500 may indicate values associated with various time related parameters. In some embodiments, e.g., where NRF 100 does not does not determine time related parameters based on recent network and/or NF information, NRF 100 may utilize default value information 500 for selecting time related parameters regardless of situation or scenario, before adjustment based on network information, NF metrics or other information. In this example, default values may be predetermined, e.g., by a network operator or a time related parameter value determination rule (e.g., in rule data 400). Continuing with this example, time related parameter values may be determined by adjusting (e.g., increasing or decreasing) default values in response to or based on at least part of current network information and/or NF information, e.g., information indicating network congestion, NRF maintenance, inter-PLMN communications, high NF load, etc.

In some embodiments, node 200, NRF 100, or TVDM 204 may be configured for identifying characteristics of a received message (e.g., determining that a received message is an inter-PLMN message or that a received message is forwarded from a visitor PLMN) and using those characteristics along with current (or recent) network conditions and/or NF metrics to dynamically determine values for time related parameters and may determine, using default value information 500, a default or initial time related parameter value for a particular time related parameter and may use a relevant rule (e.g., from rule data 400) to determine an appropriate time related parameter value for a requesting NF or related service, e.g., by increasing or decreasing the initial time related parameter value. For example, node 200 or TVDM 204 may determine that NRF or a related network portion is experiencing congestion and may determine that increasing an initial or default value for an NF heart-beat timer or interval value from 30 seconds to 60 seconds would improve congestion and/or related issues significantly. In this example, adjustment from 30 seconds to 60 seconds may be based on a formula or a percentage amount. In another example, time adjustments may be based on historical data, e.g., prior congestion events and/or related connectivity or heartbeat issues during those events.

Referring to FIG. 5, a table representing default value information 500 comprises columns and/or fields for time related parameters and corresponding default values. In some embodiments, default values may be predetermined, e.g., by a network operator or a time related parameter value determination rule (e.g., in rule data 400). A time related parameter field may store information for representing a time related parameter (e.g., 3GPP network parameters) indicating or representing or indicating a time amount or a period of time. Example time related parameters depicted in FIG. 5 include an NF heartbeat interval (e.g., a 3GPP "heart-beat timer"), an NF subscription validity time, an NF discovery validity time, an NF access token expiry time, or an HTTP header retry timer (e.g., a value in a "Retry-After" HTTP header parameter field).

A default value field may indicate a default value (e.g., an initial value) associated with a particular time related parameter. In some embodiments, default values may be in seconds, minutes, hours, or days and/or may be based on a percentage or a formula that utilizes a proposed time from an NF and/or other data (e.g., a default value for heartbeat interval parameter may 10% less than a proposed time but not to exceed 70 seconds).

As depicted in FIG. 5, a default value for an NF heartbeat interval parameter may be 30 seconds; a default value for an NF subscription validity time parameter may be 6 hours; a default value for an NF discovery validity time parameter may be 1 hours; a default value for an NF access token expiry time parameter may be 1 hour; and a default value for an HTTP header retry timer parameter may be 30 seconds.

For example, an HTTP header retry timer may represent a parameter or setting indicating an amount of time (e.g., in seconds) that an NF waits to retry a service operation at NRF 100. In some embodiments, an HTTP header retry timer may be determined when NRF 100 is to send an HTTP 503 error message indicating a service is unavailable and may be provided to an NF service consumer (e.g., NF1 207) in an "Retry-After" HTTP header field. For example, when NRF 100 undergoes an overload situation, NRF 100 may reject some HTTP requests by sending an HTTP 503 message including an HTTP header field "Retry-After" for indicating an estimated time (in number of seconds) for the recovery of the service. In this example, NRF 100 and/or TVDM 204 therein may determine the HTTP retry timer value (e.g., by adjusting a default value in response to network and/or NF conditions).

It will also be appreciated that default value information 500 are for illustrative purposes and that different and/or additional data than the data depicted in FIG. 5 may be usable for indicating default values for various time related parameters. Further, default value information 500 may be stored (e.g., in data storage 206) using various data structures and/or computer readable media.

Figure 6:
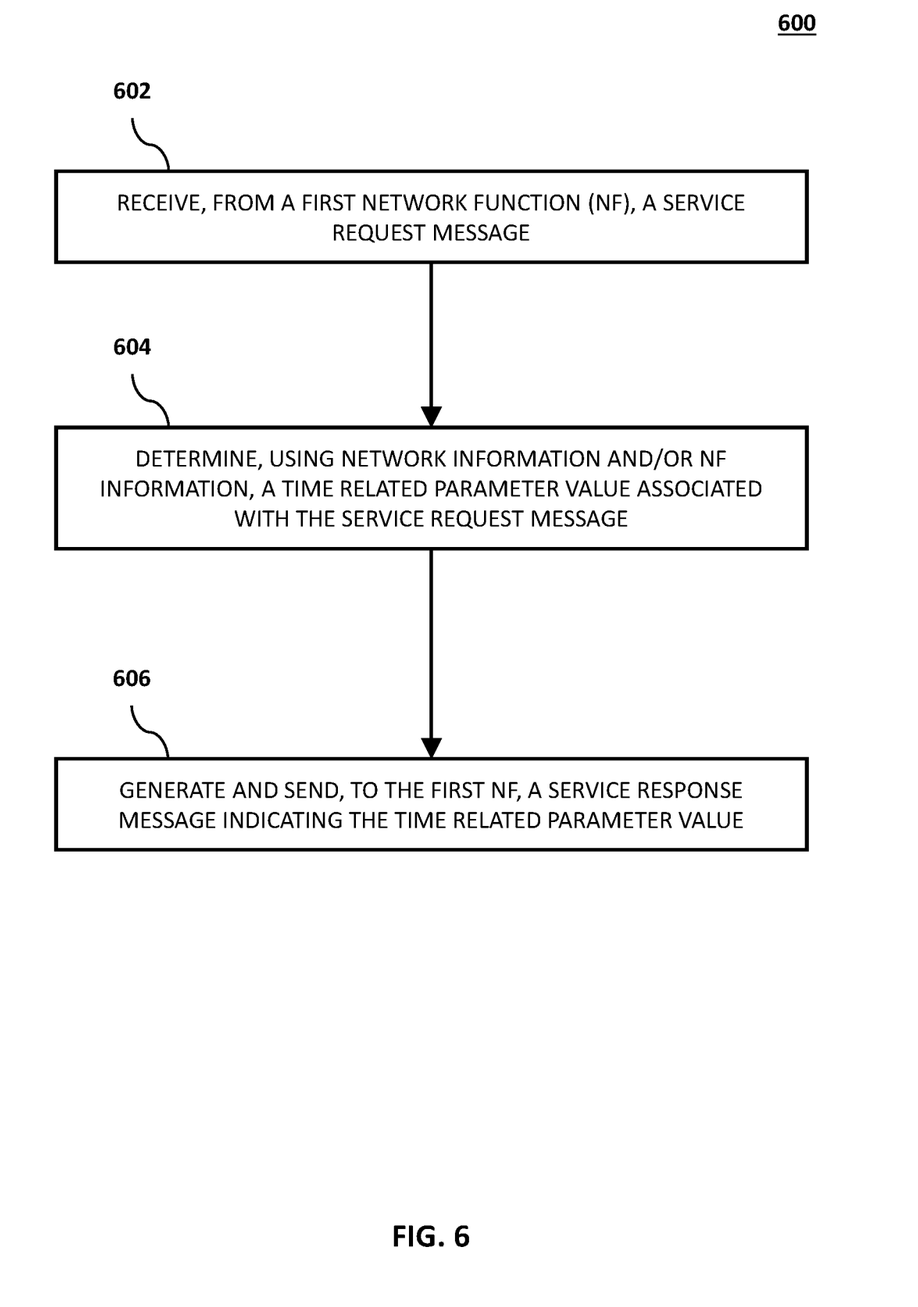
FIG. 6 is a flow chart illustrating an example process for determining time related parameter values for a communications network.

FIG. 6 is a diagram illustrating an example process 600 for determining time related parameter values a communications network. In some embodiments, example process 600 described herein, or portions thereof, may be performed at or performed by a network node, e.g., NRF 100, node 200, TVDM 204, and/or another module, NF, or node.

Referring to process 600, in step 602, a service request message may be received from a first NF. In some embodiments, a service request message may include an NF registration request message, an NF update request message, an NF status subscription request message, an NF discovery request message, or an NF access token request message.

In step 604, it may be determined, using network information and/or NF information, a time related parameter value associated with the service request message. In some embodiments, a time related parameter value may indicate an NF heartbeat interval (e.g., a 3GPP heart-beat timer), an NF subscription validity time, an NF discovery validity time, an NF access token expiry time, or an HTTP header retry timer (e.g., a value in a "Retry-After" HTTP header parameter field).

In some embodiments, at least some network information or NF information may be obtained periodically or aperiodically (e.g., dynamically) from one or more data sources, e.g., local data store (e.g., relative to NRF 100), a remote data source (e.g., relative to NRF 100), NWDAF 210, or NF data provider(s) 212.

In some embodiments, at least some network information may be obtained using an Nnwdaf_EventsSubscription service or an Nnwdaf_AnalyticsInfo service. For example, every 60 seconds or so, NRF 100 or another entity may send one or more Nnwdaf_AnalyticsInfo service request messages to NWDAF 210 for obtaining load level information for one or more network slice instances associated with a 5G communications network. In another example, NRF 100 or another entity may send an Nnwdaf_EventsSubscription service request message to subscribe to and receive an network slice specific congestion events notification from NWDAF 210.

In some embodiments, determining a time related parameter value may include determining that an NRF, a first NF, or a network entity may be experiencing a congestion status change, a change in workload amount, or an operational status change; and in response adjusting the time related parameter value from a default value or a prior value. For example, a default value or a prior value may be predetermined by a network operator or generated using a predetermined policy or rule.

In some embodiments, determining a time related parameter value may include determining that a service request message or a related message requires NRF to NRF forwarding; and in response increasing the time related parameter value from an initial or default value.

In some embodiments, determining a time related parameter value may include determining that a service request message or a related message may be an inter public land mobile network (PLMN) message; and in response increasing the time related parameter value from an initial or default value.

In step 606, a service response message indicating the time related parameter value may be generated and sent to the first NF. In some embodiments, a service response message may include an NF registration response message, an NF update response message, an NF status subscription response message, an NF discovery response message, or an NF access token response message.

It will be appreciated that process 600 is for illustrative purposes and that different and/or additional actions may be used. It will also be appreciated that various actions described herein may occur in a different order or sequence.

It will be appreciated that while some aspects of the subject matter described herein has been discussed with reference to 5G networks various other networks may utilize some aspects of the subject matter described herein. For example, any network that can benefit from dynamically determined time related parameter values, e.g., time related parameter values based on network conditions, NF related metrics, and/or other information.

It should be noted that node 200, TVDM 204, and/or functionality described herein may constitute a special purpose computing device. Further, node 200, TVDM 204, and/or functionality described herein can improve the technological field of network communications. For example, by determining time related parameter values using current network information and/or NF information, communications between NFs or other entities can be improved and timing issues can be reduced. In this example, by utilizing one or more techniques and/or methods described herein, NRF 100 or TVDM 204 therein can determine time related parameter values based on network conditions, NF related metrics, and/or other factors. Further, such techniques and/or methods described herein, may be applicable to multiple services or related interfaces including, for example, nudm-sdm, nudm-uecm, npcf-uepolicy, nsmf-pdusession, nssf-ns-selection, nnrf-disc, and/or nnrf-nfm.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.510; $3^{rd}$ Generation Partnership Project; Technical Specification Group Core Network and Terminals; 5G System; Network Function Repository Services; Stage 3 (Release 17), V17.1.0 (2021-03).
2. 3GPP TS 33.501; $3^{rd}$ Generation Partnership Project; Technical Specification Group Services and System Aspects; Security Architecture and Procedures for the 5G System; (Release 17), V17.1.0 (2021-03).
3. 3GPP TS 29.520; $3^{rd}$ Generation Partnership Project; Technical Specification Group Core Network and Terminals; 5G System; Network Data Analytics Services; Stage 3 (Release 17), V17.2.0 (2021-03)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for determining time related parameter values for a communications network, the method comprising:
    at a network function (NF) repository function (NRF) comprising at least one processor:
        receiving, from a first NF, a service request message, wherein the service request message includes an NF registration request message, an NF update request message, an NF status subscription request message, an NF discovery request message, or an NF access token request message;
        determining, using network information and/or NF information, a time related parameter value associated with the service request message, wherein the time related parameter value indicates an NF heartbeat interval, an NF subscription validity time, an NF discovery validity time, an NF access token expiry time, or a hypertext transfer protocol (HTTP) header retry timer, wherein determining the time related parameter value includes determining, by the NRF, that a condition exists for adjusting the time related parameter value from a default value or a prior value determinable by the NRF; and, in response and prior to providing the time related parameter value to the first NF, adjusting, by the NRF, the time related parameter value from the default value or the prior value; and
        generating and sending, to the first NF, a service response message indicating the time related parameter value.

2. The method of claim 1 wherein at least some of the network information or the NF information is obtained periodically or aperiodically from one or more data sources.

3. The method of claim 2 wherein the one or more data sources includes a local data store, a remote data source, a network data analytics function (NWDAF), or an NF data provider.

4. The method of claim 1 wherein at least some of the network information is obtained using an Nnwdaf_EventsSubscription service or an Nnwdaf_Analyticsinfo service.

5. The method of claim 1 wherein determining that the condition exists for adjusting the time related parameter value includes determining that the NRF, the first NF, or a network entity is experiencing a congestion status change, a change in workload amount, or an operational status change.

6. The method of claim 1 wherein the default value or the prior value is predetermined by a network operator or generated using a predetermined policy or rule.

7. The method of claim 1 wherein determining that the condition exists for adjusting the time related parameter value includes determining that the service request message or a related message requires NRF to NRF forwarding.

8. The method of claim 1 wherein determining that the condition exists for adjusting the time related parameter value includes determining that the service request message or a related message is an inter public land mobile network (PLMN) message.

9. A system for determining time related parameter values for a communications network, the system comprising:
a network function (NF) repository function (NRF) comprising:
at least one processor; and
a memory,
wherein the NRF is configured for:
receiving, from a first NF, a service request message, wherein the service request message includes an NF registration request message, an NF update request message, an NF status subscription request message, an NF discovery request message, or an NF access token request message;
determining, using network information and/or NF information, a time related parameter value associated with the service request message, wherein the time related parameter value indicates an NF heartbeat interval, an NF subscription validity time, an NF discovery validity time, an NF access token expiry time, or a hypertext transfer protocol (HTTP) header retry timer, wherein determining the time related parameter value includes determining, by the NRF, that a condition exists for adjusting the time related parameter value from a default value or a prior value determinable by the NRF; and, in response and prior to providing the time related parameter value to the first NF, adjusting, by the NRF, the time related parameter value from the default value or the prior value; and
generating and sending, to the first NF, a service response message indicating the time related parameter value.

10. The system of claim 9 wherein the NRF is configured for periodically or aperiodically obtaining at least some of the network information or the NF information from one or more data sources.

11. The system of claim 10 wherein the one or more data sources includes a local data store, a remote data source, a network data analytics function (NWDAF), or an NF data provider.

12. The system of claim 9 wherein the NRF is configured for obtaining at least some of the network information using an Nnwdaf_EventsSubscription service or an Nnwdaf_AnalyticsInfo service.

13. The system of claim 9 wherein determining that the condition exists for adjusting the time related parameter value includes determining that the NRF, the first NF, or a network entity is experiencing a congestion status change, a change in workload amount, or an operational status change.

14. The system of claim 9 wherein determining that the condition exists for adjusting the time related parameter value includes determining that the service request message or a related message requires NRF to NRF forwarding.

15. The system of claim 9 wherein determining that the condition exists for adjusting the time related parameter value includes determining that the service request message or a related message is an inter public land mobile network (PLMN) message.

16. At least one non transitory computer readable medium having stored thereon executable instructions that when executed by at least one processor of a computer cause the computer to perform steps comprising:
at a network function (NF) repository function (NRF) comprising at least one processor:
receiving, from a first NF, a service request message, wherein the service request message includes an NF registration request message, an NF update request message, an NF status subscription request message, an NF discovery request message, or an NF access token request message;
determining, using network information and/or NF information, a time related parameter value associated with the service request message, wherein the time related parameter value indicates an NF heartbeat interval, an NF subscription validity time, an NF discovery validity time, an NF access token expiry time, or a hypertext transfer protocol (HTTP) header retry timer, wherein determining the time related parameter value includes determining, by the NRF, that a condition exists for adjusting the time related parameter value from a default value or a prior value determinable by the NRF; and in response and prior to providing the time related parameter value to the first NF, adjusting, by the NRF, the time related parameter value from the default value or the prior value; and
generating and sending, to the first NF, a service response message indicating the time related parameter value.

* * * * *